Patented May 14, 1929.

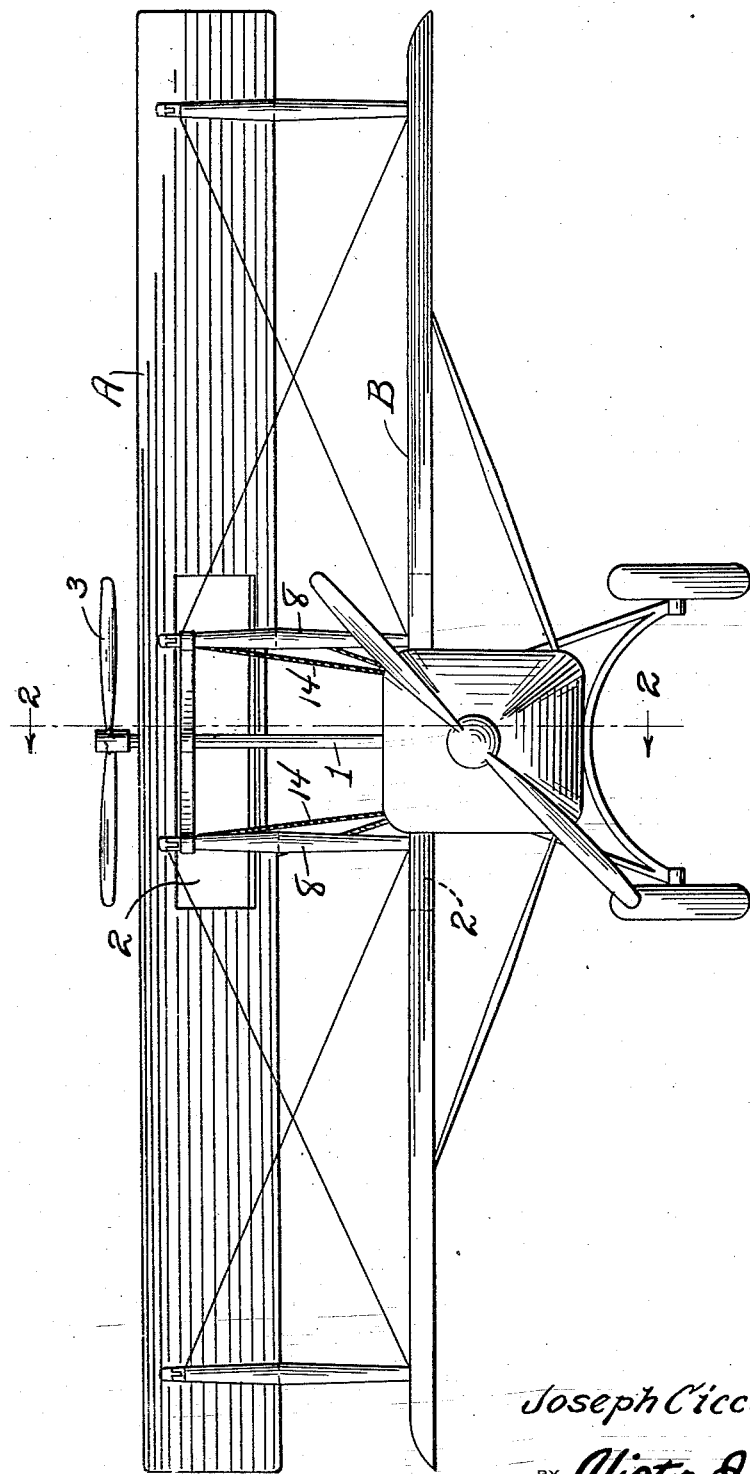

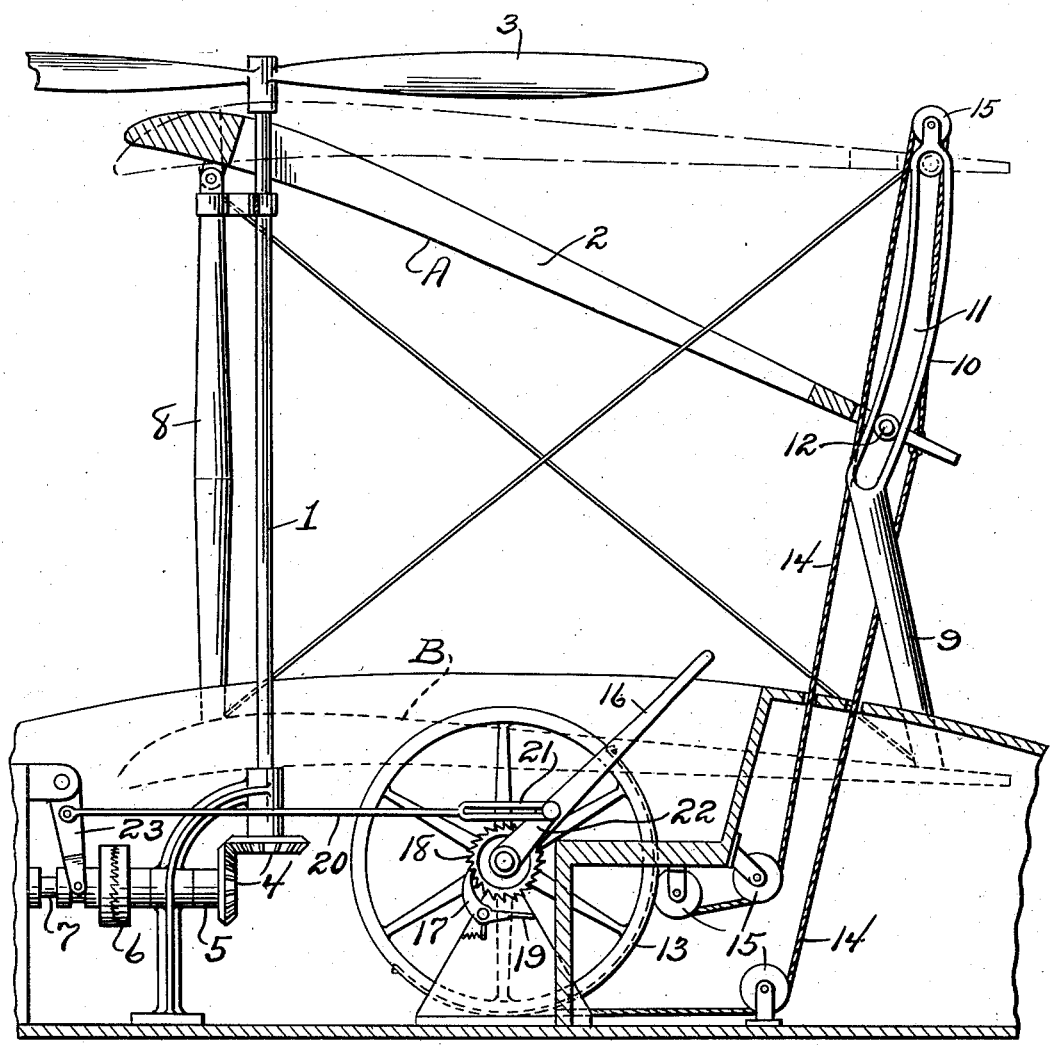

1,713,421

UNITED STATES PATENT OFFICE.

JOSEPH CICCOIANNI, OF DETROIT, MICHIGAN.

AEROPLANE.

Application filed December 14, 1928. Serial No. 326,131.

This invention relates to improvements in aeroplanes, the general object of the invention being to provide the plane with a horizontally arranged propeller for facilitating the ascending and descending movements of the plane and also to provide means for moving the upper wing of the plane into a diagonal position so that the wing will act to check the forward movement of the plane and render possible a quick landing without a long glide.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a front view of the improved plane.

Figure 2 is a section on line 2—2 of Figure 1.

In these views, the numeral 1 indicates a vertically arranged shaft which passes through an elongated opening 2 formed in the central part of the upper wing A of the plane, this shaft having a horizontally arranged propeller 3 attached to its upper end and the lower end of the shaft is connected by the beveled gears 4 with a shaft 5 with which is associated the clutch means 6 for connecting the shaft to a shaft 7 driven from the motor of the device.

The upper wing A is pivotally supported adjacent its front by the posts 8 which are suitably attached to the lower wing B or other part of the plane. The rear posts 9, or some of said posts, are each formed with an arc-shaped upper part 10 having a slot 11 therein, the slots being engaged by the rollers 12 attached to the tail part of the wing A. These rollers and slots form guiding means when the wing is moved on its pivots.

A drum 13 is rotatably arranged in the fuselage and a cable 14 passes over said drum and over the guiding pulleys 15, one of which is arranged on the upper end of one of the posts 9 and the ends of the cable are attached to the tail of the wing A, so that as the drum is rotated, the cable will act to raise or lower the tail end of the wing according to the direction of movement of the drum. Thus the wing A can be moved from its normal horizontal position, shown in dotted lines in Figure 2, to a diagonal position shown in full lines in Figure 2. In this latter position, the wing acts as a brake to check the forward movement of the craft. A handle 16 is attached to the shaft of the drum so that the drum can be partly rotated by said lever, a holding dog 17 engaging the ratchet wheel 19 on the shaft for holding the drum against retrograde movement. This dog can be released through means of the pedal part 19 thereon. A link 20, having a slotted end 21, engaging an arm 22 on the shaft, has its other end connected with the clutch fork 23 whereby the clutch can be moved to operative and inoperative position by shifting the handle 16.

The opening 2 in the upper wing and the opening 2' in the lower wing should be made large enough so as not to interfere with the passage of the air currents created by the propeller 3.

From the foregoing it will be seen that the clutch can be engaged and disengaged at the same time that the drum is partly rotated to raise and lower the upper wing, and when the wing is in lowered position and the horizontal propeller 3 is revolving, the ascending and descending movement of the plane is facilitated and the plane can land without a long glide.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

An aircraft comprising upper and lower wings, means for pivotally connecting the front end of the upper wing to its supporting members, guiding means for the tail end of the wing, means connected with the tail end of the wing for lowering and raising the same, a vertically arranged shaft passing through the upper wing, a horizontally arranged propeller on the upper end of the shaft, means for driving the shaft from the motor of the craft, the last mentioned means including clutch means and manually operated means for moving the clutch means into operative and inoperative position and for raising and lowering the tail end of the upper wing.

In testimony whereof I affix my signature.

JOSEPH CICCOIANNI.